US011932042B2

(12) United States Patent
Braschoss et al.

(10) Patent No.: US 11,932,042 B2
(45) Date of Patent: Mar. 19, 2024

(54) CLAMP OPENING SYSTEM FOR A MACHINE FOR PRODUCING ADHESIVELY BONDED PRINTED PRODUCTS

(71) Applicant: Mueller Martini Holding AG, Hergiswil (CH)

(72) Inventors: Peter Braschoss, Zofingen (CH); Pascal Mueller, Malters (CH)

(73) Assignee: MUELLER MARTINI HOLDING AG, Hergiswil (CH)

( * ) Notice: Subject to any disclaimer, the term of this patent is extended or adjusted under 35 U.S.C. 154(b) by 135 days.

(21) Appl. No.: 17/382,389

(22) Filed: Jul. 22, 2021

(65) Prior Publication Data

US 2022/0032676 A1 Feb. 3, 2022

(30) Foreign Application Priority Data

Jul. 30, 2020 (DE) ..................... 10 2020 120 131.1

(51) Int. Cl.
*B42C 19/08* (2006.01)
*B42C 9/00* (2006.01)

(52) U.S. Cl.
CPC ............ *B42C 19/08* (2013.01); *B42C 9/0006* (2013.01)

(58) Field of Classification Search
CPC ...................................................... B42C 19/08
USPC ........................................................... 412/10
See application file for complete search history.

(56) References Cited

U.S. PATENT DOCUMENTS

| | | | | |
|---|---|---|---|---|
| 3,669,246 | A * | 6/1972 | Risi | B42C 19/08 412/9 |
| 4,507,036 | A * | 3/1985 | Rathert | B42C 19/08 412/22 |
| 5,141,377 | A | 8/1992 | Rathert | |
| 10,259,250 | B2 | 4/2019 | Altenbach et al. | |
| 2006/0177286 | A1 | 8/2006 | Rygol | |

(Continued)

FOREIGN PATENT DOCUMENTS

| | | | |
|---|---|---|---|
| CN | 201338436 | Y * | 11/2009 |
| CN | 201338437 | Y * | 11/2009 |
| CN | 105730046 | A * | 7/2016 |

(Continued)

OTHER PUBLICATIONS

DE1262221-B English Translation (Year: 1968).*
CN-201338437-Y English Translation (Year: 2009).*
CN-105730046-A English Translation (Year: 2016).*

*Primary Examiner* — Kyle R Grabowski
(74) *Attorney, Agent, or Firm* — LEYDIG, VOIT & MAYER, LTD.

(57) ABSTRACT

A machine produces an adhesively bonded book block. The machine has a clamp chain equipped with spaced apart binder clamps, which are connected to a clamp opening system. The clamp opening system has a movable internal aid for a binder clamp and an external aid, which are operably connected together. The aids open clamping jaws of the binder clamp. At a loading location for the book block, the external aid is operated by a drive to execute pressing operation on the movable internal aid. The moveable internal aid achieves an opening of the clamping jaws depending on a thickness of the book block. A recoil force is established with the drive-related pressing operation, which is converted as a pressing force onto the book block in a running cycle.

14 Claims, 4 Drawing Sheets

(56) References Cited

U.S. PATENT DOCUMENTS

| | | | |
|---|---|---|---|
| 2009/0060683 | A1 | 3/2009 | Hug et al. |
| 2011/0255939 | A1 | 10/2011 | Winkelmann et al. |

FOREIGN PATENT DOCUMENTS

| | | | | |
|---|---|---|---|---|
| DE | 1262221 | B | * | 3/1968 |
| DE | 102010012308 | A1 | | 9/2011 |
| DE | 102010015128 | A1 | | 10/2011 |
| EP | 0384129 | B1 | | 6/1993 |
| EP | 1688269 | A2 | | 8/2006 |
| EP | 2030801 | A1 | | 3/2009 |
| EP | 3141398 | A1 | | 3/2017 |
| GB | 858730 | A | | 1/1961 |

* cited by examiner

CLAMP OPENING SYSTEM FOR A MACHINE FOR PRODUCING ADHESIVELY BONDED PRINTED PRODUCTS

CROSS REFERENCE TO RELATED APPLICATIONS

This application claims benefit to German Patent Application No. DE 10 2020 120 131.1, filed on Jul. 30, 2020, which is hereby incorporated by reference herein.

FIELD

The present invention relates to an opening system for binder clamps in a machine, preferably in an adhesive binder, for producing adhesively bonded printed products, book blocks.

BACKGROUND

In adhesive binders, the clamps, i.e., their clamping jaws, are opened by means of a fixed curve operatively connected thereto and at most also closed, insofar as no direct rebound is available. This means that the clamping jaws of each clamp are opened to the same value during the production of equally thick book blocks.

For this purpose, the specified clamp is supplemented with a roller which runs along an oblique angle belonging to a slotted link in such a way that a translational movement is initiated by transmitting the path thereby taken, which creates the specified opening of the clamp jaws. These locally arranged slotted links are provided in the form of an elongated tab, allowing them to cover more than one clamp at a time.

If a new order with different size book block thicknesses follows a repetitive production of book blocks, the adhesive binder, is first completely emptied before the introduction of the new production. Subsequently, the slotted links are set to the new thickness of the book block be processed, and accordingly the binder clamps (also referred to herein as brackets) and the slotted links operatively connected to them are readjusted accordingly.

Since the clamping jaws of each clamp are set with the same opening in each case, the opening mass per book in BDV mode (book thicknesses variance) cannot be achieved optimally, since the opening of all clamps can no longer be set to the specific book block thickness.

A further weak point during operation of an adhesive binder is that the position of the clamps during operation can suffer from an undesired displacement for different reasons. No provisions have currently become known in the state of the art which consistently monitors this positioning of the brackets in order to be able to intervene in the event of tolerance overshoots due to adjustments.

Each clamp thus opens maximized at each cycle; a completely circumferential return to the underlying position is thus effected. This provision is subject to a time delay since, depending on the desired opening width of the clamping jaws, several rounds of the clamping chain are necessary until the intended opening is achieved over all clamps of the system.

With each opening and closing of the individual clamp, the slotted links exert an internal force on the clamp, whereby the resulting force component is directed in the opposite direction of the transport path. The impact on the clamp resulting from this during the opening process triggers a vibrating movement on the clamp chain, which leads to a change in speed; this negatively affects the book bumper-block accuracy during the positioning of the flap at the relevant processing station. This recurrent impact can also greatly impair the positional accuracy of the adhesive application on the book block, gradually or immediately, as well as a precise machining of the book block itself along the other processing stations of the adhesive binder.

Book block tongs for clamping and transporting book blocks in book block machining machines are disclosed in EP1688269 A2. The book block tong consists essentially of an inner clamping jaw provided with an outer clamping jaw which is arranged in parallel and relatively movable and which exerts a clamping force on the book block via drive and force transmission means.

Another state of the art book block processing machine with brackets for clamping and transporting book blocks can be found in EP0384129 B1. Here, the control rollers for opening the clamping jaws also pass through control curves, which are arranged at any position of the path of the conveyor.

SUMMARY

In an embodiment, the present disclosure provides a machine that produces adhesively bonded printed products, including a book block. The machine has a circulating clamp chain equipped with binder clamps spaced apart from one another. Each of the binder clamps are operatively connected to a clamp opening system. The clamp opening system has aids comprising a movable aid internal to a binder clamp, of the binder clamps, and an aid external to the binder clamp. The aids are operatively connected to one another. The aids are configured to open clamping jaws belonging to the binder clamp. At a loading location for the book block, the aid external to the binder clamp is operable by a drive to execute a drive-related pressing operation on the movable aid internal to the binder clamp. The moveable aid internal to the binder clamp is configured to achieve a prespecified opening of the clamping jaws belonging to the binder clamp depending on a thickness of the book block to be received. A recoil force is configured to be established with the drive-related pressing operation, which is configured to be converted as a pressing force onto the received book block in a cycle that is running.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
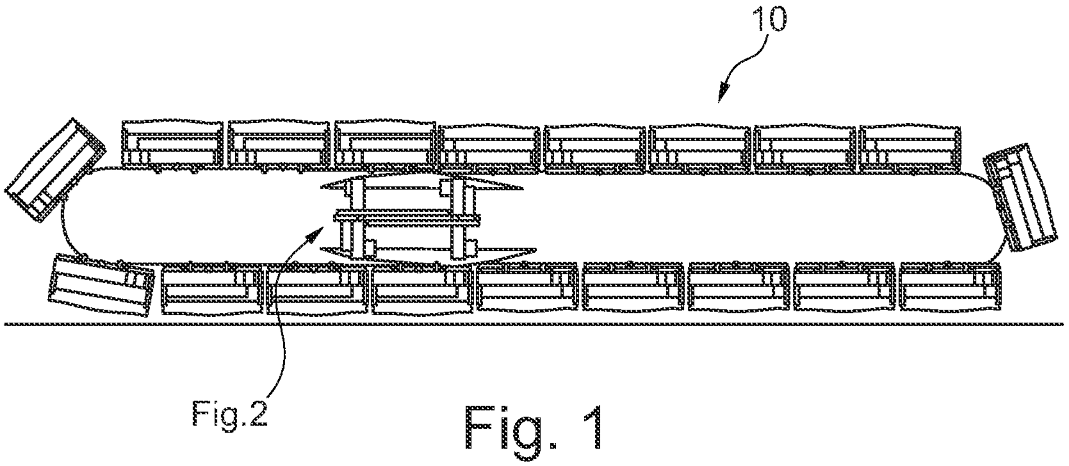
FIG. 1 illustrate an adhesive binder.

Embodiments of the present invention provide improvements over the state of the art. Embodiments of the present invention provide a clamp opening system integrated into a machine, in which each individual binder clamp can be loaded continuously with the same or differently dimensioned book blocks during cyclic operation according to a predetermined production speed, before the binder clamps belonging to the clamp chain subsequently pass through the individual processing stations of the machine, i.e., the adhesive binder, along the predetermined path.

The clamp opening system according to embodiments of the present invention is accordingly operated in such a way that the required opening of the clamping jaws belonging to the binder clamp is directly created according to the respective thickness of the book block to be processed, whereby an individual opening in accordance with the cycle can then be provided in such a way that continuous and without interruption or blank cycles, book blocks with greatly differing thicknesses and formats can also be detected and fed to further processing.

Accordingly, the opening process acting on the clamping jaws of the binder clamp is no longer initiated via a control curve firmly arranged along the path of the adhesive binder, instead this opening process is perceived according to an embodiment of the present invention by means of a locally positioned assembly in the form of a force-exerting drive unit, which introduces an individual opening of the clamping jaws in the respectively passing binder clamp in operative connection with an aid inside the clamp, so that this is no longer limited to a fixed predetermined opening according to a predetermined control curve, as is the case according to the state of the art.

Each binder clamp thus has an aid inside the clamp, preferably in the form of a movable tab, which device is operatively connected at least to the loading and discharging location (also called the loading and discharging station) of the book block to the locally positioned force-exerting drive unit, in such a way that the drive aid exerts a compressive force on the movable tab guided within the binder clamp, this compressive force causes a planar displacement of this tab, so that the desired opening of the clamping jaws is initiated and thus created.

This tab is preferably a plate matched to the forces exerted, the length of which corresponds approximately to the expansion of the binder clamp, and the width of which is configured according to the free space within the binder clamp.

In this pressing process, in addition to the opening of the clamping jaws belonging to the binder clamp, a recoil force, preferably via spring elements, is simultaneously also built up, which, after completion of the pressing process, is available in the form of an established spring-dependent pretensioning force, wherein this pressing force is then available for exerting the clamping force on the clamped book block.

Of course, the pressing force acting on the clamped book block can also be provided by other coordinated force-emitting units, for example by hydraulic, pneumatic or other mechanical devices or units.

A further similarly constructed force-exerting drive unit for transmitting the pressing force to the movable tab within the binder clamp is then positioned at least on the downstream side of the processing stations belonging to the adhesive binder in order to initiate the discharge (ejection operation) of the finished book block: Here as well, the force-exerting drive is used analogously as described above in that it again compresses the tab, and thus the clamping jaws, starting from the predetermined clamping state, opening them to such an extent by a further amount so that the book block can then be correctly separated from the binder chamber. The empty binder clamp then continues along the path of the clamp chain to the location where the opening kinematics for receiving a book block for processing brought there takes place.

The underlying drive unit here can be fitted beyond these originating locations (loading and unloading stations), also at any other locations along the path of the clamp chain of the adhesive binder, either for the intermediate respectively premature discharging of a non-quality-compliant book block from the manufacturing process, whether in order to perform a pre-opening of the clamping jaws, preferably before the actual loading station of the book block, where the closing of the book block-based opening is then subsequently performed.

In order to secure the quality of the processed book block over the course of the machining process, sensors can be provided at a suitable location, which then forwards the information recorded to the main controller of the system, which then ensures the implementation of the regulation conform measures.

An additional cycle increase of the system can thus also be achieved in that information obtained by sensors is detected before the correct pick-up point of the block, from which the effective opening of the clamping jaws for the binder clamp can be deduced and the pre-opening explained above can thus be disposed as needed, as a result of which the switching-on of compensating empty cycles can be sustainably dispensed with.

The drive unit for exerting the pressing force on the tab is preferably designed as an actuating motor, which has a movable lever equipped with at least one roller on the outside. The specific pressing force is then exerted on the tab via this lever/roller, preferably in the sense of a linear or quasi-linear force/path curve, wherein other degressive or progressive force/path curve are also possible by a corresponding control of the actuating motor.

In principle, the force transmission carried out by the drive unit can easily be achieved during the opening of the clamping jaws, since the roller-side pressing force generally takes place along a uniformly running pressing plane. With regard to the magnitude of the exerted contact pressure force, it must be dimensioned such that it simultaneously enables the generation of a potentially available recoil force, which can then be used as a contact pressure for exerting the clamping action on the respective book block. If the potential of the contact pressure is provided, for example, via a spring, the corresponding degree of spring deflection is then available as a contact pressure.

A significant advantage of embodiments of the present invention is therefore, that the opening of the clamping jaws can be aligned individually and continuously to the respective thickness of the book block to be processed, and this also in the case of larger differences in thickness of the book blocks provided, whereby it is then no longer necessary to work with empty cycles to compensate such differences in thickness, which has a positive effect on the productivity of the adhesive binder per unit of time.

In the case of particularly greater differences in thickness of the book blocks to be processed, a limited number of empty cycles can be provided, whereby in such cases, a remedy can also be created, in that the further solution according to embodiments of the present invention can be enabled, which consists in the fact that the previously pre-opening of the clamping jaws explained above can be pre-activated upstream of the correct loading station of the book block. With the clamp opening system according to embodiments of the present invention, each binder clamp can thus be operated in BDV mode (Buch Dicken Varianz, English: book thicknesses variance) to the effect that conformal adjustments can be made directly to any changing book block thickness.

Such measures have the operational advantage that the set-up time at the processing stations of the adhesive binder can be reduced to zero. This makes it possible to continuously process different orders without interrupting the cycle. In other words, different book block thicknesses can be continuously processed over the entire adhesive binder without having to resort to machine standstill or empty cycles.

Since each binder clamp is set to the respective book block thickness in an opening direction that is purely perpendicular to the transport path of the binder clamps, there is also no risk that interfering forces are discharged onto the clamp chain or develop, which would, for example, impair the placement accuracy of the ribbon on the book block.

Aspects of the present invention thus relate to a machine for producing adhesively bonded printed products, book blocks, wherein this machine is preferably constructed as an adhesive binder and consists essentially of a circumferential clamp chain equipped with binder clamps spaced apart from each other. At the stations in question, each binder clamp is operatively connected to a clamp opening system consisting of at least one aid internal to the clamp and one aid external to at least one clamp, wherein both aids operate interdependent with respect to one another, the operation of which leads to an opening of the clamping jaws belonging to the binder clamp.

At a loading location (also called a loading station) of the book block, the aid external to the clamp performs a pressing operation on the aid internal to the clamp movable in the binder clamp, thus a pre-scheduled opening of the clamping jaws belonging to the binder clamp takes place. This opening depends on the thickness of the book block to be accommodated, whereby at the same time a spring-related pretensioning force is built up by this pressing operation, as already explained above, which then acts directly during the running cycle as a contact pressure in relation to the accepted book block.

The further development of the subject matter according to the present invention is then to supplement this machine for producing adhesively bonded book blocks in such a way that another clamp-external means is arranged at the delivery location of the book block within the revolving clamp chain. Which ensures that the now processed book block can be dispensed from the binder clamp by activating the external aid of the clamp according to the same principle as above. This thus takes place in such a way that the tab integrated into the binder clamp is now pressed a further distance until that opening of the clamping jaws is reached which allows the unlimited release of the processed book block.

Consequently, the circumferential bracket chain is equipped with at least two aids external to the bracket which ensure the requirements for loading and unloading the book block. The mode of operation of the aid external to the clamp unwinds uniformly at both locations, namely in such a way that in each case an intended large opening of the clamping jaws is created within the binder clamp so that the functional loading and unloading of the book block can take place. Meanwhile, as needed, additional clamp-external aids can be arranged along the circumferential clamp chain, which, after different operative dispositions, can act on the respective binder clamp according to the same criteria as described above.

In principle, it is such that the aid external to the bracket, as already stated above, is constructed as an independent drive group, each of which acts in the plane of the internal bracket aid and consists of a drive unit for the motor-driven lever with at least one roller arranged at the end as a pressure medium.

As a result of a pivoting movement of the lever belonging to the drive unit, the roller presses on the outer line guidance of the aid external to the clamp designed as a tab in such a way that the desired opening of the binder clamp is produced by the pressure path. This contact pressure movement on the tab takes place directly as soon as the binder clamp is at the level of this drive group, and this contact pressure movement is then completely maintained within the respective cycle, this is within the time span which is available for the functional loading and unloading of the binder clamps with a book block.

The contact pressure force converted by the aid external to the clamp, thus the force provided by the drive group for operating the aid internal to the clamp, i.e., the tab, is always in an immediate relationship to the contact pressure to be built up, which is available when it comes to secure the book block in a force-fit manner, to the extent that the applied contact forces on this book block are able to securely absorb the resulting processing forces in the individual stations.

As already explained above, the structure of the contact force on the book block is preferably provided by spring force. However, this does not rule out such a contact force, as already explained above, can also be provided by controlled mechanical, pneumatic, or hydraulic mechanisms.

Normally, the loading location of the book block is arranged upstream and the discharge location is arranged downstream of the processing stations of the machine operating in the circumferential direction of the clamp chain. In particular, if it comes to providing an advanced intermediate opening of the clamping jaws relative to the proper loading location of the book block, this advanced opening is temporarily fixed by a holding mechanism up to the location where the proper opening rate to be converted is reached.

The subject matter of the present invention also relates to a method for operating a machine for producing adhesively bonded printed products, book blocks, wherein the machine essentially consists of a circumferential clamp chain equipped with binder clamps spaced apart from each other. Each binder clamp interacts with a clamp opening system consisting of at least one aid internal to the clamp and external to at least one clamp, wherein both aids are in an operative connection with one another. As a result of the operative interdependence of these two aids with respect to one another, an opening of the clamping jaws belonging to the binder clamp is achieved. At a loading location of the book block, the preferably permanently arranged aid external to the bracket performs a pressing operation on the aid internal to the movable bracket in the binder clamp, whereby a targeted opening of the clamping jaws belonging to the binder clamp is achieved depending on the thickness of the book block to be received. At the same time, a recoil force is built up by this pressing operation, which then reaches the received book block as a contact force during the running cycle, wherein this recoil force is always directly available as soon as the tab leaves the domain of the force-exerting drive described above.

The subject matter of the present invention also relates to a method for operating a machine for producing adhesively bonded printed products, book blocks, wherein the machine substantially consists of a circulating clamp chain equipped with binder clamps spaced apart from one another. Each binder clamp is operatively connected to a clamp opening system consisting of at least one aid internal to the clamp and at least one aid external to the clamp, wherein both aids are operatively connected to one another. Due to the operative interdependence of these two aids with respect to one another, the opening of the clamping jaws belonging to the binder clamp is then additionally interacted on. This conversion is used when the aid external to the bracket is acted upon by a further pressing operation on the already generated recoil impact force at a discharge location of the block in such a way that this creates the additional opening that enables the clamped block to be released. As soon as the tab has in turn left the domain of the force-exerting drive described above, the clamping jaws of the binder chamber are completely or partially closed.

The system, i.e., the circulation of the clamp chain, is expanded as needed by at least one further clamp opening system which locally acts on the binder clamps when it comes to introducing various provisions. Thus, for example, if a premature discharge of a qualitatively defective book block emerges from the production run.

Such a (third) clamp opening system, which operates according to the same sequence as in loading and unloading stations, is preferably pre-dispensed with the loading station of the book block in order, according to the same principle, to introduce a pre-dispensed opening of the clamping jaw belonging to the binder clamp there. This opening rate is then temporarily or continuously fixed by means of a holding mechanism. This fixation is then unlocked with the introduction of a further opening, for example during the loading process of the book block.

This holding mechanism preferably consists of a ratchet and with a movable pawl operatively connected thereto, which ensures the locking of the clamping jaws in a certain Position.

FIG. 1 shows a typical high-performance adhesive binder belonging to the state of the art. In order to avoid unnecessary repetitions, reference is made here to publication EP3141398 A1.

Figure 2:
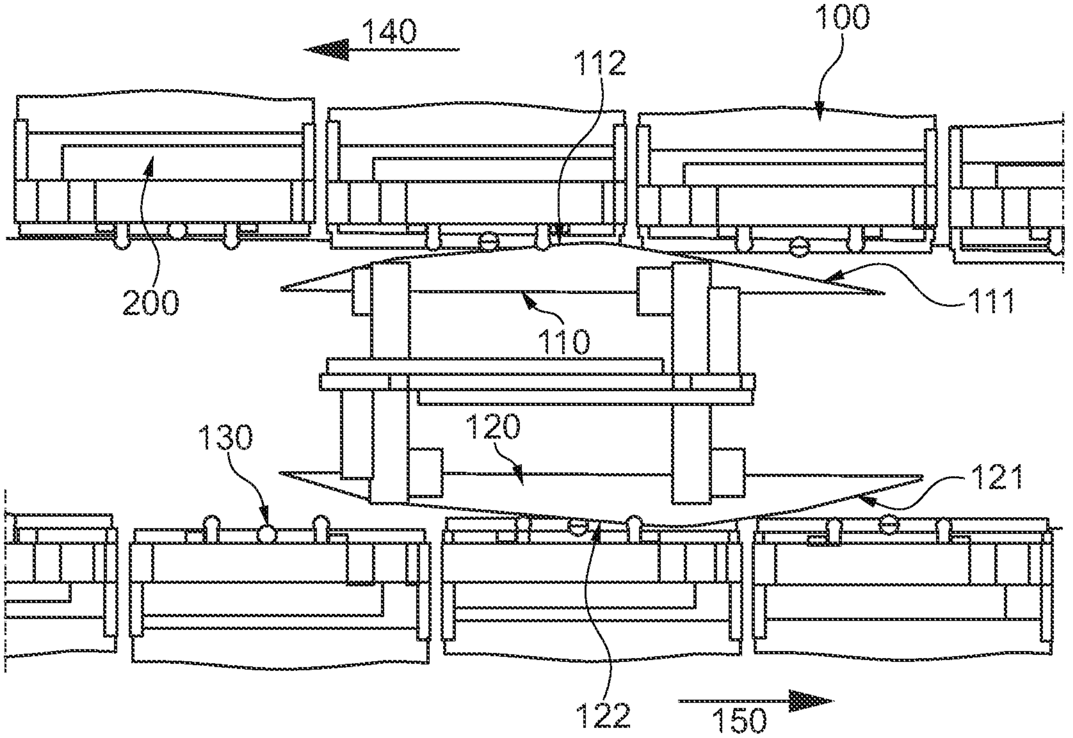
FIG. 2 illustrates movement kinematics when the binder clamp is opened.

FIG. 2 shows an illustration of a state of the art opening/closing system of a binder clamp belonging to an adhesive binder, which is operated as a machine for producing adhesively bonded printed products, also referred to in the following as book blocks.

The description and mode of operation of a state of the art binder clamp is explained in the following: The solid part of the binder clamp 100 is guided through a chain along the path defined by the adhesive binder, wherein the movable part of this binder clamp develops an internal dynamic with respect to its solid part, in such a way that the movement surrounding therewith unwinds perpendicularly to the binder clamp 100, this is relative to the two running directions 140/150 of the binder clamp in relation to the supply and discharge locations of the book block. The inner dynamic of movement of the binder clamp on the basis of opening and closing is operatively connected to a central torsion spring, the pretension of which is built up at the respective operating point, wherein the resulting potential spring force is then available for the frictional connection to be exerted for fixing the inserted book block.

Insofar as a state of the art holding system (see below under FIGS. 5 and 6, position 170, wherein this holding system is however designed specifically for the binder clamp according to an embodiment of the present invention), which can be switched on and off at different fixed time intervals during operation of the adhesive binder, the binder clamp can be set open during part of its operation.

In principle, it is such that the pawl of the system engaged once absorbs the force of a preloaded spring and thus ensures that the binder clamp occupies a certain opening (see in this FIG. 2 the opening of the binder clamp in relation to the placed book block 200). The pawl itself is preferably spring-loaded so that it can assume a certain position determined by a frictional connection during the latching. This means that such a pawl ensures that the binder clamp cannot in each case directly close due to the effect of the established torsional spring force, this is not until the pawl is in the engaged position. Accordingly, the binder clamp can be "open" by such a latching during part of its travel.

The state of the art opening/closing system of the binder clamp, which operates during operation of the adhesive binder after a locally defined opening and closing, in itself have a uniform opening rate of the binder clamps, which is indexed by the fixedly predetermined slotted link (see below). Accordingly, such a system cannot be used to achieve a variation in the opening rate using a specific slotted link from a binder clamp to the next.

FIG. 2 then further details the illustration of the opening and closing system of the binder chamber. Two splitters 110, 120, one on the inlet side (inlet splitters 110) and one on the outlet side (outlet splitters 120), are in operative connection with the binder clamps 100 passing through, thereby implementing these openings, which are designed for various operative purposes. Normally, the binder clamps operate at a fixed predetermined opening and closing rate.

The two connecting links 110, 120 mentioned always assume a fixed position with respect to the passing binder clamps 100. As already indicated, fixed structured splitters 110, 120 are present here, which is why it is necessary to plan that, in principle, different openings must also be provided for different book block thicknesses of the book, wherein this can be set up by different positions of the splitters or, in general, achieved by corresponding splitters.

As already explained above, each binder clamp has a specific opening at the respective loading location. This means that in such cases, if the opening should not be sufficient for a certain book block thickness, this can only be corrected by adaptation(s) to the connecting blocks 110,120 that precede the opening. Accordingly, no further opening rates can be implemented above the maximally producible opening for a certain splitter for opening at a specific opening rate.

In the meantime infeed splitter 120 remains in a fixed, predetermined Position during the closing process following the introduced book block 200. The binder clamp has a fixed cam roller 130 on the inlet slotted link side, which scans the front running edge of the binder clamp 120 during the infeed of the binder clamp; this takes place between a first contact point 121 and a last contact point 122, so that an opening of the same 100 is introduced by means of a triggered internal displacement of the rear clamping jaw of the binder chamber.

This simultaneous opening builds up a pretensioning force indicated by a torsion spring, which then acts as a resulting contact force on the inserted book block during the closing process. When this pretensioning force is introduced onto the torsion spring, a pawl is lifted or retracted from its stationary latching position or released via a complementary crank in such a way that the generated force of the pretensioned torsion spring is first transmitted to the binder clamp in a force-fit manner, This initiates the closing of the clamping jaws of the binder clamp, which leads to a clamping action on the clamped book block, and thus to the layer which points from the local position point in place 160.

During the further course of the inlet section 150, the cam roller 130 belonging to the binder clamp initially remains in constant contact with the inlet crank 120 in such a way that the clamping jaw of the binder clamp can be closed onto the book block in a controlled manner, as a result of which no quality reducing pressure-related markings can occur. During this process, the pawl remains in a non-operative state in such a way that the contact force of the torsion spring can be completely converted. After completion of the book block processing, at least as a result of the machining of the book block back, application of the adhesive, positioning of the flap, the pawl re-engages in the mechanism of the binder clamp with direct action on the torsion spring.

After completion of the book block via the production stations, the corresponding binder clamp moves toward the outlet slotted link 110, wherein the dynamics acting on the binder clamp behave similarly to the loading location of the book block with regard to the inlet slotted link 120 as was also the case at this delivery location of the completed book block, as described above.

At this discharge point, it must then only be ensured that the clamping jaw of the binder clamp opens at a sufficiently large rate so that the completely manufactured book block can leave the binder clamp unimpeded.

As can easily be seen from FIG. 2, with each opening and closing of each binder clamp, the splitters emit a force on each binder clamp in the opposite direction of the transport path. In this force conversion between the cam roller 130 and the discharge gate 110, respectively the loading slotted link 120 an impact can be expected, which leads to interference on the speed of the bracket chain, which negatively affects the positioning of the flap. This slotted/binder clamp impact can often also impair the accuracy of the application of the adhesive for the book block back as well as the other adhesive bonding processes.

The current inlet and outlet curves cannot be adjusted in a time-compliant manner from cycle to cycle. A main reason is that the current inlet and outlet curves are relatively elongated so that they can simultaneously detect a plurality of binder clamps. For this reason, the set-up time for changing the book block thicknesses can also be time-consuming with several thickness specifications, in particular when the opening of the binder clamp takes place over several phases, i.e., when several cycles of the clamp chain are necessary. The existing loading and discharge curves 110/120 are dimensioned to be correspondingly long so that a crash does not occur when a clamp is actuated with an incorrect opening to one of the two curves.

A Crash can occur when a binder clamp is closed by incorrect manual operation, or when the binder clamp is erroneously not loaded with a book block. The loading and discharge curves are also formed relatively long in order to prevent the binder clamps from closing too quickly for a detected book block, or the binder clamps can fall onto the book block due to a malfunction of the pawl. The type of current system implementation means that for each cycle, the clamp chain can receive an interfering impact in the opposite direction of travel due to the impact between the cam roller and the course of the curve.

Figure 3:
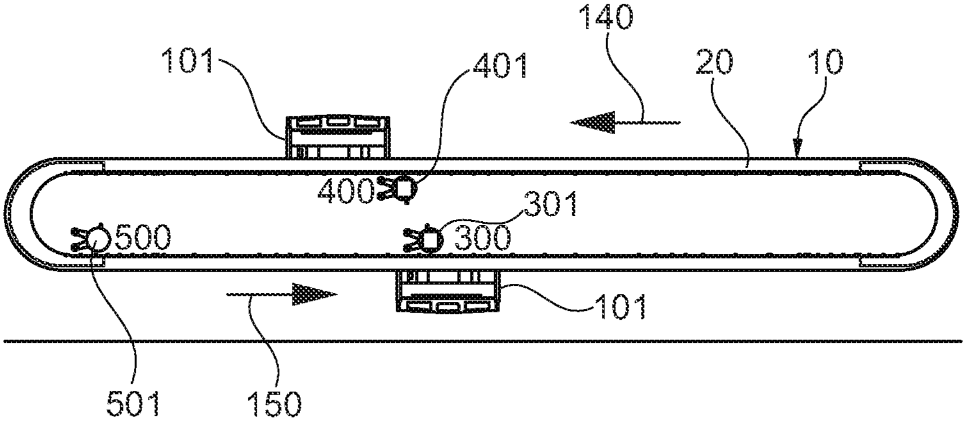
FIG. 3 schematically shows a disposition according to and embodiment of the invention for opening the binder clamp.

FIG. 3 schematically shows an adhesive binder clamp opening system according to and embodiment of the present invention consisting of a first drive unit 301 at the loading location 300 (also called a loading station) in the inlet area 150, a further drive unit 401 at the discharge point 400 (also called a discharge station) in the outlet area 140, And a further drive unit 501 at an intermediate station 500, wherein the latter drive unit generally performs the function of controlling the binder clamp 101 upstream of the assembly 301 as required. This makes it possible to support the binder clamp 101 in advance for the required opening at the loading station 300 in such a way that each binder clamp 101 can then be adjusted to a thickness of the book block to be received subsequently taking place, and this can be implemented at full production speed.

This makes it possible for the book blocks successively introduced into the adhesive binder to also have continuously different thicknesses. This means that the opening system of the binder clamp is no longer controlled via a fixed slotted link with a fixed opening, but takes place by means of a drive unit 301, 401, 501 individually controlled by a local drive, which can provide the desired opening of the binder clamp in full production run.

The main advantage of these provisions is that the opening of the binder clamp can be continuously adapted to the book block to be produced, and this can generally be achieved without switching on empty cycles, wherein, given exceptionally large differences in thickness of the book blocks, it is at most necessary to provide the interposition of at most two empty cycles. Accordingly, it is such that with the binder clamp opening system according to an embodiment of the present invention, each binder clamp in BDV mode can be optimally adjusted to a specific book block thickness, thus completely eliminating a setup time between different book block thicknesses.

If the machining of different lots is planned in advance, the different orders can be carried out without interruption for the purpose of setup provisions, so that the thickness of the book block to be processed can become progressively thicker or degressively thinner without a machine standstill.

Since the setting of each binder clamp 101 is direction bound and runs purely perpendicular to the transport path thereof, no direct or secondary forces arise on the clamp chain 20 so that the placement accuracy does not deteriorate in particular, but not only, when the book block is being bound.

In order to achieve these objectives, it is planned that with the two fixed placed slotted links (see FIG. 2, Pos. 110, 120) are replaced, and instead each binder clamp 101 has an integrated geometrically compact tab (i.e., without bevel) which is operated by a force-exerting drive arranged externally as a component of the associated units 301, 401, 501 (see also FIG. 7), in particular at the inlet and outlet of the respective stations 300, 400, 500. In this case, the pressing force is controlled by a movable lever which inserts the tab into the interior of the binder clamp under force conversion and consequently establishes the pretensioning of the torsion spring or of another element.

An identical force-exerting drive unit 401 for transmitting the pressing force to the movable tab within the binder clamp 101 is then arranged in the outlet area 140, that is to say on the downstream side of the processing stations belonging to the adhesive binder, with the purpose of initiating the dispensing (ejection operation) of the finished book block: In this case as well, the force-exerting drive is used analogously to the above in that it again presses on the tab and thus the clamping jaws of the binder clamp open to an extent by a further amount starting from the predefined clamping state so that the book block can detach properly from the binder clamp. The empty binder clamp then continues along the orbit of the clamp chain 20 to the intermediate station 500 and/or to the loading station 300, at which the kinematics again arrive for receiving a book block brought into processing.

The underlying drive here can also be provided beyond its proper use at the (main) stations 300 (loading), 400 (unloading), even at any other location along the path of the bracket chain (or binder clamp chain) 20 of the adhesive binder 10, unless, for example, intermediary for premature discharge from the machining process of a non-quality book block, whether in order to form a pre-opening of the clamping jaws of the binder clamp, preferably before the actual loading 300 of the book block, as is the case, for example, by drive unit 501.

Accordingly, in addition to the loading and unloading stations 300, 400, at least a third station 500 is now also provided according to an embodiment of the present invention. This station is referred to herein as "Make Ready". It enables a change in the opening of the binder clamp between the discharge station 400 (discharge location) and the loading station 300 (receiving location). During continuous operation, the change in the opening of the binder clamp can be relatively large. For example, opening values of the binder clamp of 90 mm at the discharge station 400 should be able to be collected to 20 mm at the loading station 300.

The "Make Ready" station 500 should be arranged as close as possible to the loading station 300: In this way, the adhesive binder can be adjusted in terms of control technology in such a way that such an opening change of the binder clamp must be implemented as late as possible.

In this third Station 500, the opening of the binder clamp takes place completely independently of the preceding or downstream binder clamp. Under the premises that the adhesive binder is set to a maximum opening over the entire range, production speeds of up to 7,000 cycles per hour can be maintained without further ado. In addition, this third Station can provide intermediate required openings without setup time intervals.

The respective configuration of the binder clamps during operation can be determined by contactless sensors, with the result that the respective opening of the arriving binder clamps is ascertained in advance before it has reached the respective station, with the final purpose that the controller engages automatically as needed in order to introduce remedial precautions on all sides.

This intervention also comes into effect if incorrect manipulations occur after the start of the adhesive binder, for example if the predetermined dynamics of a binder clamp are erroneously intervened. Even after detecting a malfunction, the controller can reduce the running speed of the adhesive binder until the proper operation has normalized itself again.

Sensors should then be provided to maximize the safety of the entire system, which provide information about the exact current opening of the binder clamps arriving at the individual stations 300, 400, 500.

In principle, the subject matter according to the present invention has a great flexibility, especially if it comes to ensure the continuing proper incorporation of different thicknesses of book blocks. Whereby the subject matter of the present invention differs significantly from the state of the art in that the underlying thickness variation (BDV) from one binder clamp to the next can no longer vary quantitatively within the narrow limits of quantitative±3.25 mm as is the state of the art.

Indeed, an advanced adhesive binder should be able to capture a book block thickness that either progressively increases from 13 mm to at least 20 mm from one binder clamp to the next or vice versa. It is obvious that at such intervals, the adaptation of greater thickness differences from one binder clamp to the next has to be carried out as quickly as possible. According to aspects of the present invention, it is, furthermore, now possible that the impact of the cam roller (FIG. 2, position 130) to the slotted links (FIG. 2, position 110, 120), which has regularly led to judder of the clamp chain 20, is now completely eliminated.

Figure 4:
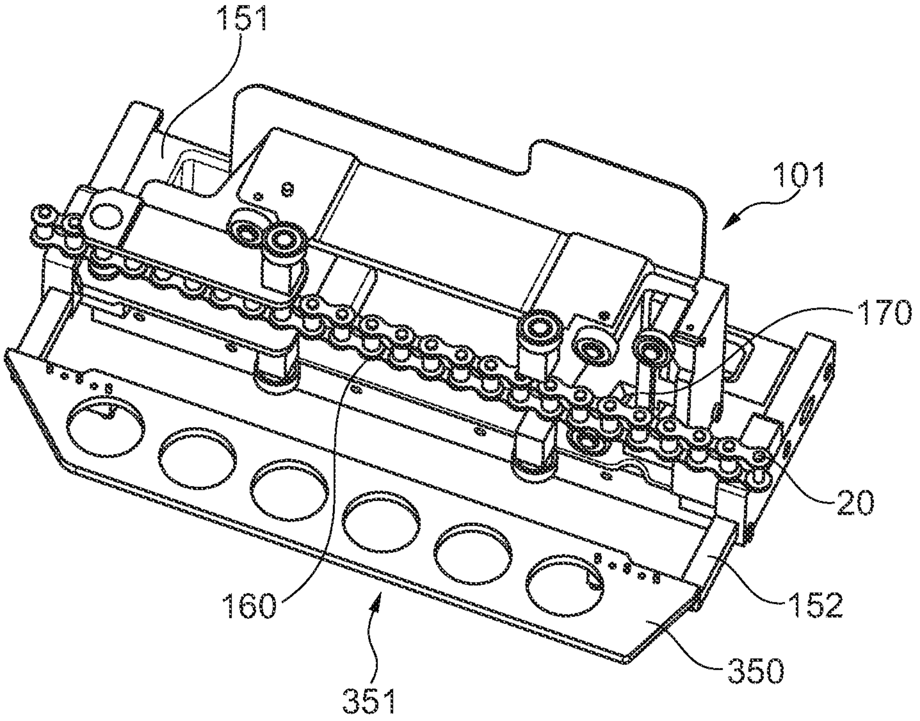
FIG. 4 shows the modified part of the binder clamp into which a movable tab is now integrated.

FIG. 4 shows the modified part of the binder clamp 101, which is shown here in the closed state. The modified part of the binder clamp according to embodiments of the present invention now consists of a movable tab 350 which replaces the state of the art kinematics for the opening of the binder clamp (see FIG. 2). This tab 350 is, in each case, pushed into the binder clamp 101 by a force 351 generated from the outside by the drive units 301, 401, 501, upon which the part 151 of the binder clamp 101 arranged on the outside is correspondingly pushed open in operative connection with a toothed rack 152, so that the desired opening is set for receiving the book block. In this process, a torsion spring 160 integrated into the binder clamp 101 is simultaneously pretensioned, wherein this pretensioning is available if the book block has to be detected in a force-fitting manner.

It should be noted that the closing of the binder clamp should preferably take place in a speed-controlled manner so that the book block is not damaged by excessive impact with indentations or dents. This also applies if this involves an unloaded binder clamp: Here as well, the closing speed must be controlled in such a way that no unnecessary impacts result which regularly lead to noise and damage.

For example on the upper side of this torsion spring 160 (see FIG. 5), the clamping chain 20, already described, runs, which performs the transport of the binder clamps. In this figure, various rollers and levers can also be seen which tune the transport guidance of the respective binder clamp along the individual processing stations of the adhesive binder 10. Furthermore, FIG. 4 shows the upper roller of a holding system 170, the design and mode of operation of which is explained in more detail in FIG. 6.

Figure 5:
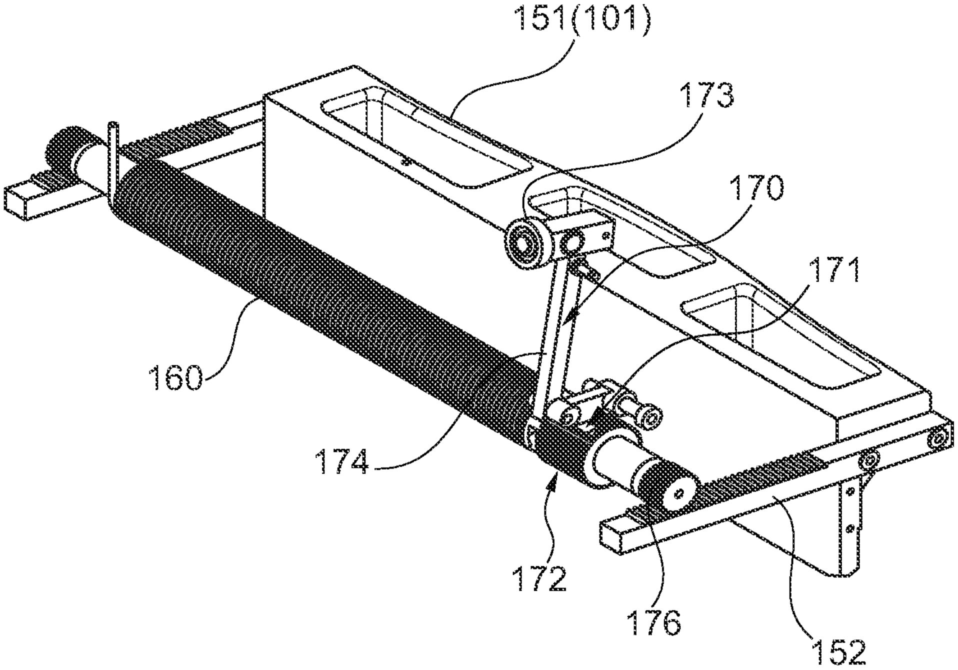
FIG. 5 shows the interaction of the torsion spring intended for pretensioning with a holding system.

FIG. 5 shows the interaction of the torsion spring 160 with the retaining system 170 already mentioned. As already explained, the binder clamp experiences during the opening process (position 151, see also FIG. 4) by means of the force introduced by the tab 350 onto said torsion spring 160, an inner, potentially available pretensioning force, which is then available as a pressing force relative to the book block (see FIG. 4). The holding system 170 is generally switched on and off at various fixed times during operation of the adhesive binder, so that it is possible to transport the binder clamp at least partially open during part of its revolution. For this purpose, the holding system absorbs the force of the torsion spring 160 as needed and thus ensures that the binder clamp has a specific opening. The mechanism of the holding system 170 in turn is under spring force so that the pawl 171 belonging to the latch mechanism can be latched in a position forming relative to the opening of the part 151 of the binder clamp (101) arranged on the outside.

This means that the binder clamp can initially no longer close under the action of the pretensioned torsional spring force as long as the pawl 171 is not positively engaged in the ratchet 172. A lateral geometric continuation of the ratchet 172 is formed by a pinion 176 which is operatively connected to the toothed rack 152. In order to cancel or partially change the opening of the binder clamp, the pawl 171 has to be disengaged, and this takes place by pressing the upper-side roller 173 of the holding system 170 by a controlled mechanical function in such a way that a translational movement transmits therefrom to the linkage 174 of the pawl system, which ultimately effects the disengagement.

Figure 6:
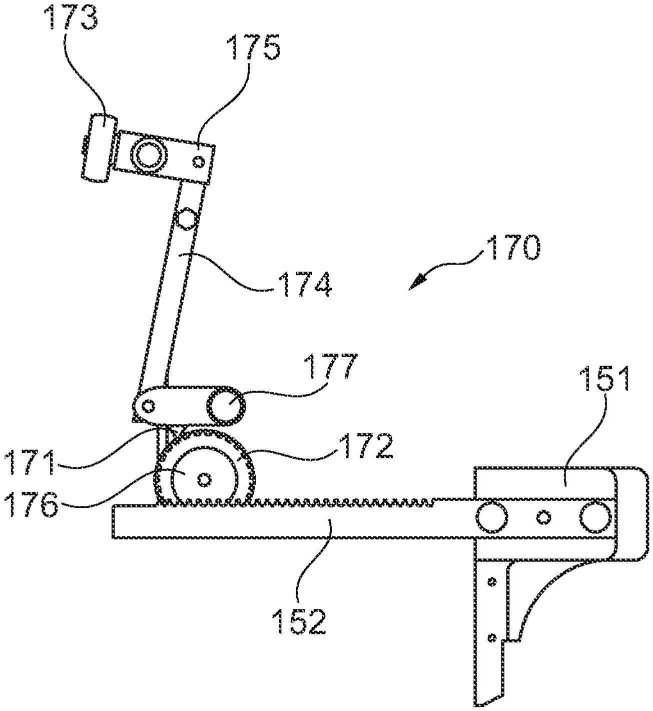
FIG. 6 shows the holding system according to FIG. 5 from a different perspective.

FIG. 6 shows the same holding system 170 as in FIG. 5, but from a different perspective. The torsion spring (see FIG. 5, pages 160) is no longer visible in this perspective because it is now located on the same axis behind the ratchet 172 designed as a roller. The continuation on the toothed rack side 152 of the torsion spring which is clearly visible in FIG. 5 is provided with a bolt-shaped pinion 176. On the one hand, this pinion is operatively connected to the toothed rack 152 and on the other hand, this pinion is also operatively connected to the torsion spring via the ratchet 172 in such a way that the introduced opening of the rear part 151 of the binder clamp (see FIGS. 4 and 5) simultaneously pretensions the torsion spring. In this process, the pawl 171 moves empty over the toothing of the ratchet 172 by a laterally acting mounting device 177, i.e., the spring force specifically acting on the pawl is no longer operational in this process.

As already explained, the binder clamp is guided during the opening process (position 151, see also FIG. 4), always pretensioned by said torsion spring 160, which results from displacement, already mentioned, of the tab 350 into the interior of the binder clamp (see FIG. 4).

As already explained above in FIG. 5, the holding system 170 is generally switched on and off at various fixed times during operation of the adhesive binder, which makes it possible to hold the binder clamp at least partially open during part of its revolution. For this purpose, the holding system receives the force of the torsion spring 160 as needed by engaging the pawl 171 in the ratchet and thus ensures that the binder clamp has a specific opening. The mechanism of the holding system 170 is in turn spring-loaded in such a way that the associated pawl 171, forming a position relative to the opening of the part 151 of the binder clamp (101) arranged on the outside, can engage in a force-fit manner.

This means that the binder clamp can initially no longer close, i.e. is blocked, under the torsional spring force as long as the pawl 171 remains frictionally engaged in the ratchet 172. A continuation of the ratchet 172 is formed by a bolt-shaped pinion 176 which is operatively connected to the toothed rack 152. In order to cancel or partially change the opening of the binder clamp, the pawl 171 has to be disengaged, and this takes place by pressing the upper-side roller 173 of the holding system 170 by a controlled mechanical function in such a way that a translational movement transmits to the linkage 174 of the holding system, which ultimately effects the disengagement.

Figure 7:
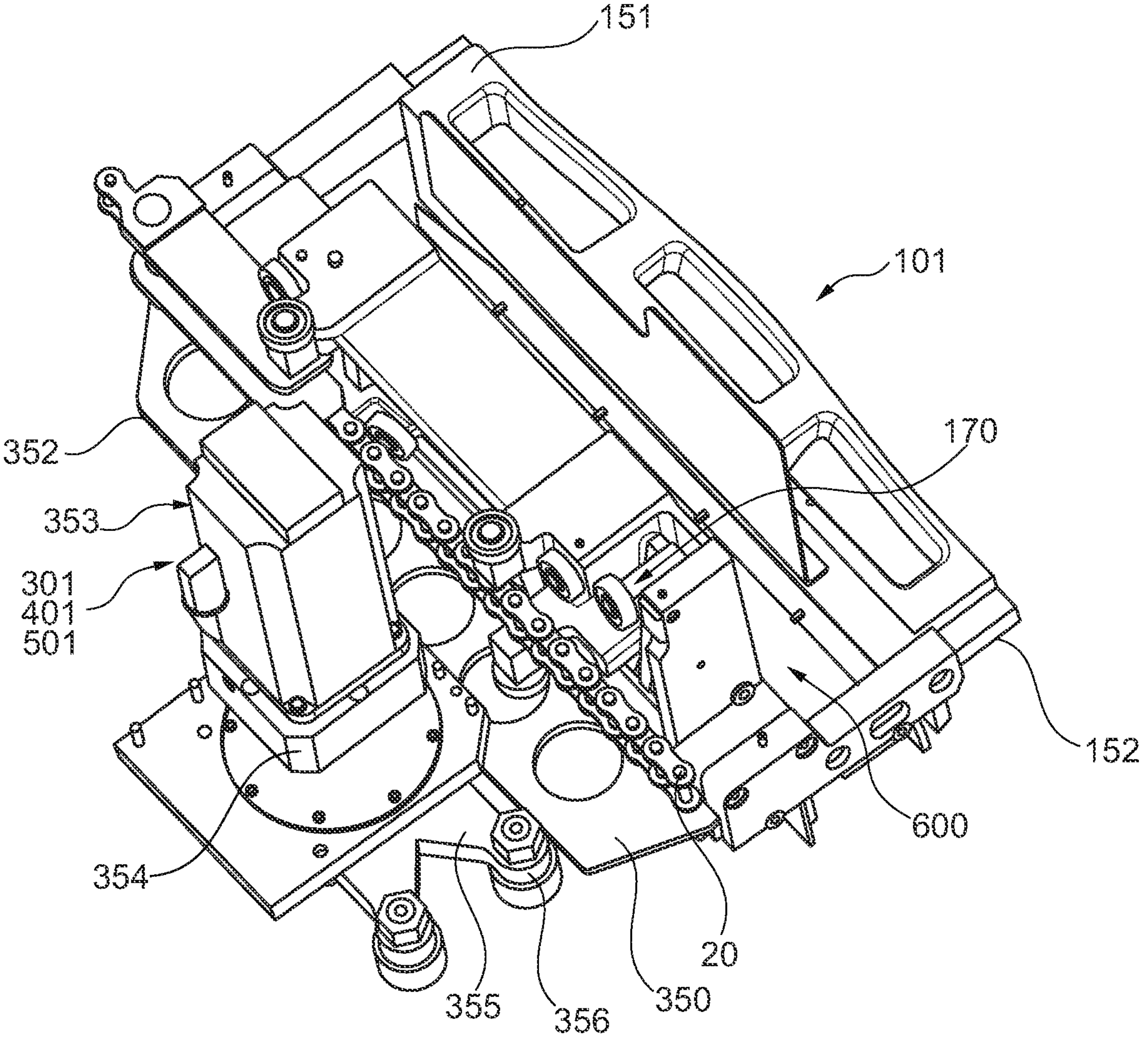
FIG. 7 shows the closer construction of the binder clamp in the environment of an aggregate, which initiates the operation of inserting the tab in an operationally compliant manner.

FIG. 7 shows the closer construction of the binder clamp 101 in the environment of a drive unit 301 for the loading station 300, which introduces the operation-compliant insertion of the tab 350 into the binder clamp. The drive units 401, 501 indicated in FIG. 3 have the same structure as the drive unit 301; and they convert identical kinematics to the respective tab of the respective binder clamp in the other stations 400, 500.

The closing of the binder clamp at the loading station 300 (see FIG. 3) and the opening of the same at the discharge station 400 (see FIG. 3) of the system according to embodiments of the present invention functions in a manner similar to the commended solution above for the prior art (see FIG. 2). In both cases, however, the similarity can only be seen in the fact that a solid predispensed opening of the binder clamp is placed at the loading and discharging stations 300 and 400. However, the actual way in which the opening and closing of the binder clamp according to embodiments of the present invention takes place is fundamentally different. This difference also ensures that various block thicknesses of book can be processed continuously.

Accordingly, instead of the curve roller belonging to the binder clamp (see FIG. 2, Pos. 130), which is arranged along the curve course of the stationary slotted link (see FIG. 2, Pos. 110, 120), the rollers 356 now belonging to the movable lever 355 press against the front edge 352 of the movable tab 350 at said stations in such a way that at least one partial opening 600 of the binder clamp 101 is thus achieved via the forward sliding of the toothed rack 152 by piercing the part 151 arranged on the outside.

This FIG. 7 also shows the other important components of the system, the clamp chain 20 of the adhesive binder 10 (see FIG. 3) and the holding system 170 (see FIG. 6).

The movable levers 355 are each driven by a drive unit 301, 401, 501 which is arranged stationary at the respective stations 300, 400, 500, and which consists of at least one Motor 353 and one transmission 354, as a result of which each roller 356 mounted on a lever 355 can specifically accommodate the movement binder clamp retrieved by a controller of the unit without delay.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A machine for producing adhesively bonded printed products, comprising a book block, the machine consisting essentially of:

a circulating clamp chain equipped with binder clamps spaced apart from one another, each of the binder clamps being operatively connected to a clamp opening system, wherein the clamp opening system comprises aids comprising a movable aid internal to a binder clamp, of the binder clamps, and an aid external to the binder clamp, wherein the aids are operatively connected to one another, wherein the aids are configured to open clamping jaws belonging to the binder clamp, wherein at a loading location for the book block, the aid external to the binder clamp is operable by a drive to execute a drive-related pressing operation on the movable aid internal to the binder clamp, wherein the moveable aid internal to the binder clamp is configured to achieve a prespecified opening of the clamping jaws belonging to the binder clamp depending on a thickness of the book block to be received in a particular cycle that is running such that an individual opening of the clamping jaws is configured to be adaptable from cycle to cycle in accordance with the prespecified opening provided for the corresponding cycle in such a way that continuous, and without interruption or blank cycles, book blocks with differing thicknesses and formats are capable of being fed to the binder clamp at the loading location, and wherein a recoil force is configured to be established with the drive-related pressing operation, which is configured to be converted as a pressing force onto the received book block in the particular cycle that is running.

2. The machine according to claim 1, wherein the prespecified opening has an equal or different opening rate at the loading location, a discharge location, and at a further operative location.

3. The machine according to claim 1, wherein the drive consists essentially of a motor and a transmission.

4. The machine according to claim 1, wherein the movable aid internal to the binder clamp comprises a tab.

5. The machine according to claim 1, wherein the aid external to the binder clamp comprises at least one lever and at least one roller arranged at an end of the at least one lever.

6. The machine according to claim 1, wherein the loading location is arranged upstream of processing stations of the machine formed as an adhesive binder operating in a circumferential direction of the circulating clamp chain.

7. The machine according to claim 1, wherein the prespecified opening in each case of the clamping jaws belonging to the binder clamp is configured to be temporarily or continuously fixed by a holding system.

8. The machine according to claim 7, wherein the holding system consists essentially of a ratchet and of a movable pawl which is operatively connected thereto and which is configured to cause a locking of the clamping jaws in a certain position.

9. The machine according to claim 1, wherein the drive indicates a pivoting movement of the aid external to the binder clamp, by which pivoting movement, the pressing operation is configured to be transmitted to a front plane of the movable aid internal to the binder clamp.

10. The machine according to claim 1, wherein at least at the loading location or an unloading location of the book block or at another operating location along the circumferential clamp chain, an opening of the clamping jaws belonging to the binder clamp is configured to be created by at least one roller in operation with a moving lever, by which opening procedure a recoil force is configured to be established at the same time.

11. The machine according to claim 10, wherein the recoil force is configured to be converted by a pretensioning force of a spring by a conversion of a mechanical, pneumatic, or hydraulic force.

12. The machine according to claim 11, wherein the spring is a torsion spring.

13. A machine for producing adhesively bonded printed products, comprising book blocks, the machine comprising:

a circulating clamp chain comprising binder clamps spaced apart from one another, each of the binder clamps being operatively connected to a respective clamp opening system, and each of the binder clamps being configured to circulate along a transport path between a loading location for receiving a book block of a current cycle and a discharge location for discharging the book block of the current cycle, wherein for a binder clamp of the binder clamps, the respective clamp opening system comprises:

a moveable tab that is configured to be pushed toward an interior of the binder clamp by an outside force provided by at least one drive, the outside force being perpendicular to the transport path;

a toothed rack operatively coupled to the moveable tab, a holding system, a torsion spring, and at least a portion of clamping jaws of the binder clamp;

wherein the holding system comprises a latching ratchet, wherein the at least one drive is configured to controllably apply the outside force to the moveable tab such that the moveable tab is pushed toward the interior of the binder clamp causing a corresponding translational movement of the toothed rack, the corresponding translational movement of the toothed rack being configured to pretension the torsion spring and configured to move at least the portion of the clamping jaws such that the clamping jaws are in a predefined open position, wherein the machine is configured to controllably operate the at least one drive to apply the outside force based on a thickness of the book block to be received in the current cycle, wherein machine is configured to operate the holding system to controllably fix the clamping jaws in the predefined open position, and wherein the toothed rack is configured such that, in a clamping state of the binder clamp, the toothed rack transmits the pretention force of the torsion spring to at least the portion of the clamping jaw such that a pressing force is applied to the book block received in the current cycle.

14. The machine of claim 13, wherein the machine is configured to controllably operate the at least one drive to apply the outside force in a different cycle subsequent to the current cycle based on a thickness of a different book block to be received in the different cycle.

* * * * *